United States Patent
Pong et al.

(10) Patent No.: US 11,062,097 B2
(45) Date of Patent: Jul. 13, 2021

(54) INVENTORY CONTROL SYSTEM AND A METHOD OF CONTROLLING INVENTORY

(71) Applicant: Sato Holdings Kabushiki Kaisha, Tokyo (JP)

(72) Inventors: Tai Wai Pong, St Peters (AU); Hugo Lohrer, Dulwich Hill (AU)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 308 days.

(21) Appl. No.: 15/998,640

(22) PCT Filed: Feb. 15, 2017

(86) PCT No.: PCT/IB2017/050832
§ 371 (c)(1),
(2) Date: Aug. 16, 2018

(87) PCT Pub. No.: WO2017/141164
PCT Pub. Date: Aug. 24, 2017

(65) Prior Publication Data
US 2020/0334426 A1  Oct. 22, 2020

(30) Foreign Application Priority Data
Feb. 16, 2016 (AU) .................... 2016900522

(51) Int. Cl.
*G06Q 30/00* (2012.01)
*G06K 7/10* (2006.01)
(Continued)

(52) U.S. Cl.
CPC ....... *G06K 7/10297* (2013.01); *G06Q 10/087* (2013.01); *G07C 9/00896* (2013.01); *G06K 2007/10504* (2013.01)

(58) Field of Classification Search
CPC .................. G06K 7/10297; G06Q 10/087
(Continued)

(56) References Cited

U.S. PATENT DOCUMENTS

| | | | |
|---|---|---|---|
| 6,707,381 B1* | 3/2004 | Maloney | G07G 1/0054 340/568.1 |
| 6,989,749 B2* | 1/2006 | Mohr | B25H 3/028 340/572.1 |

(Continued)

FOREIGN PATENT DOCUMENTS

| | | |
|---|---|---|
| JP | 2009-269705 A | 11/2009 |
| JP | 2010208808 A | 9/2010 |
| JP | 2010-247906 A | 11/2010 |

OTHER PUBLICATIONS

International Search Report dated May 12, 2017, issued in counterpart application No. PCT/IB2017/050832. (4 pages).
(Continued)

*Primary Examiner* — Ahshik Kim
(74) *Attorney, Agent, or Firm* — Westerman, Hattori, Daniels & Adrian, LLP

(57) ABSTRACT

An inventory control system for controlling inventory in a receptacle comprising a plurality of compartments, comprising an electronic reader, at least one antenna, a controller, and a processor. The electronic reader is configured to read a plurality of electronic labels in a plurality of the compartments of the receptacle, each electronic label being associated with, and identifying, an item in one of the compartments. The at least one antenna is in communication with the electronic reader, associated with two or more compartments and configured to read electronic labels in the two or more compartments so that the electronic reader identifies a group of labels associated therewith. The controller controls access to a selected one of the compartments at a time. The processor is responsive to the group of labels and the
(Continued)

selected one of the compartments to determine the contents thereof and a compartment location of each item.

16 Claims, 3 Drawing Sheets

(51) Int. Cl.
  *G06Q 10/08* (2012.01)
  *G07C 9/00* (2020.01)
(58) Field of Classification Search
  USPC .......................................... 235/385
  See application file for complete search history.

(56) References Cited

U.S. PATENT DOCUMENTS

| | | | | |
|---|---|---|---|---|
| 8,770,479 | B1* | 7/2014 | Shoenfeld | G07F 17/0092 235/385 |
| 2003/0117281 | A1 | 6/2003 | Sriharto et al. | |
| 2006/0192001 | A1* | 8/2006 | Shaffer | G06Q 10/087 235/385 |
| 2007/0115127 | A1 | 5/2007 | Harper et al. | |
| 2007/0205894 | A1* | 9/2007 | Nelson | G06Q 10/087 340/572.1 |
| 2008/0001760 | A1* | 1/2008 | Oh | H01Q 1/2216 340/572.7 |
| 2008/0088454 | A1 | 4/2008 | Flores et al. | |
| 2010/0252626 | A1* | 10/2010 | Elizondo | G06Q 10/087 235/385 |
| 2012/0283871 | A1* | 11/2012 | Chai | G06F 21/32 700/237 |
| 2014/0138440 | A1* | 5/2014 | D'Ambrosio | G06K 7/1413 235/385 |
| 2016/0307150 | A1* | 10/2016 | Rogers | G06Q 10/08 |

OTHER PUBLICATIONS

Written Opinion dated May 12, 2017, issued in counterpart application No. PCT/IB2017/050832. (8 pages).
International Preliminary Report on Patentability (Form PCT/IPEA/409) of International Application No. PCT/IB2017/050832 dated Apr. 25, 2018, with PCT Article 34 Amendment. (17 pages).
English Translation of Office Action dated Feb. 9, 2021, issued in counterpart JP Application No. 2018-543341. (6 pages).

* cited by examiner

INVENTORY CONTROL SYSTEM AND A METHOD OF CONTROLLING INVENTORY

CROSS-REFERENCE TO RELATED APPLICATIONS

The present application is a national phase entry of International application no. PCT/IB2017/050832 (Publication no. WO 2017/141164 A1) filed on 15 Feb. 2017, which claims priority from Australian Provisional Patent Application No 2016900522 filed on 16 Feb. 2016, the content of which is incorporated herein by reference.

TECHNICAL FIELD

The present disclosure relates, generally, to inventory tracking and, more particularly, to an inventory control system for, and a method of, controlling inventory in a receptacle comprising a plurality of compartments.

BACKGROUND

Radio frequency identification (RFID) is a wireless identification method where data are electronically stored on a tag, and the data are read by an RFID reader. RFID tags can be attached to objects that need to be identified or tracked. RFID tags can be passive, active, or semi-passive and different types of readers are used for the different types of tags.

RFID tags provide a simple and efficient way of tracking items because tags or labels can be attached to objects while minimally interfering with such objects. For example, inventory control systems are able to scan a container with an RFID reader, count the number of objects with RFID tags attached to them and identify those objects.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Where RFID is used in inventory tracking, the strength of the antenna used may be such that, in combination with the configuration of the container used for the items to be tracked, it is not possible to pinpoint the exact location of tracked items. For example, if an RFID antenna is positioned next to two drawers in a single cabinet and RFID tags are identified by the reader, then the identified tags may be present in either one of those two drawers. One solution is to use two separate antennas for each drawer and to electromagnetically isolate the drawers using electromagnetic shielding so that each antenna is only able to read the contents of its respective drawer. However, providing electromagnetic shielding is cumbersome, expensive and does not scale easily.

Described herein are an inventory control system and a method of controlling inventory whereby a more specific location of a tracked item can be determined from a more granular reading obtained from an RFID system.

In one aspect of the disclosure, there is provided an inventory control system for controlling inventory in a receptacle comprising a plurality of compartments, the system including: an electronic reader configured to read a plurality of electronic labels in a plurality of the compartments of the receptacle, each electronic label being associated with, and identifying, an item in one of the compartments of the receptacle; at least one antenna in communication with the electronic reader, the at least one antenna being associated with two or more compartments and configured to read electronic labels in the two or more compartments so that the electronic reader identifies a group of labels associated with the two or more compartments; a controller controlling access to a selected one of the compartments at a time; and a processor responsive to the group of labels and the selected one of the compartments to determine the contents of each compartment and a compartment location of each item.

In another aspect of the disclosure, there is provided an inventory control system for use with a receptacle comprising a plurality of compartments, the system including: an electronic reader configured to read a plurality of electronic labels in a plurality of the compartments of the receptacle, each electronic label being associated with, and identifying, an item in one of the compartments of the receptacle, wherein the electronic reader comprises at least one antenna; a controller controlling access to a selected one of the compartments at a time; and a processor responsive to the read electronic labels and the selected one of the compartments to determine the contents of the compartments and a compartment location of each item.

The compartments of the receptacle may be substantially transparent to electromagnetic radiation emitted by the at least one antenna.

In one embodiment, the electronic reader may read the plurality of electronic labels continuously via the at least one antenna. In another embodiment, the electronic reader may read the plurality of electronic labels periodically when or after the selected one of the compartments has been accessed. In this specification, the term "periodically" is to be understood, unless the context clearly indicates otherwise, as meaning being repeated at regular or irregular intervals.

The processor may update the determined contents of the compartments and compartment locations of the items when or after the selected one of the compartments has been accessed.

The at least one antenna may be insensitive to orientations of the electronic labels. The at least one antenna may lie between compartments so that the electronic reader reads electronic labels in compartments above and below the location of the at least one antenna.

The controller may control access to the plurality of compartments based on a pick-list of items configured by a user and activated by a user identifier.

In another aspect of the disclosure, there is provided a method of controlling inventory in a receptacle comprising a plurality of compartments, the method including: reading a plurality of electronic labels in a plurality of the compartments of the receptacle, each electronic label being associated with, and identifying, an item in one of the compartments of the receptacle; controlling access to the plurality of compartments; and determining the contents of the compartments and a compartment location of each item, based on compartments accessed and labels read. The reading may be performed using at least one antenna that reads electronic labels in more than one of the compartments In a third aspect of the disclosure, there is provided a method of controlling inventory in a receptacle comprising a plurality of compartments, the method including: receiving identification data of a plurality of read electronic labels in the plurality of the compartments of the receptacle from a single antenna associated with that plurality of compartments, each electronic label being associated with, and identifying, an item in one of the compartments of the receptacle; monitoring access to the plurality of compartments; and responsive to the received identification data and the monitored access, determining the contents of the compartments and a compartment location of each item.

The determining may occur when or after a compartment has been accessed.

The receiving may include reading the plurality of electronic labels in the plurality of the compartments.

The method may further include controlling access to a selected one of the compartments at a time.

In one embodiment, the reading may be continuous. In another embodiment, the reading may occur periodically, when or after the selected one of the compartments has been accessed.

The method may further include generating or updating a location database with the determined compartment locations of the items.

In a fourth aspect of the disclosure, there is provided a method of controlling inventory in a receptacle comprising a plurality of compartments, the method including: receiving a pick-list of items configured by a user; retrieving a compartment location for each item from a location database; providing an access control configuration based on the compartment locations; monitoring which, if any, compartment has been accessed; receiving identification data of a plurality of read electronic labels in the plurality of the compartments of the receptacle from a single antenna associated with that plurality of compartments, each electronic label being associated with, and identifying, an item in one of the compartments of the receptacle; responsive to the identification data and the monitoring of access to the compartments, determining the contents of the compartments and a compartment location of each item; and updating the location database with the determined compartment locations of the items.

The receiving of the plurality of read electronic labels may include reading the plurality of electronic labels in the plurality of the compartments.

The method may further include, responsive to the access control configuration, controlling access to a selected one of the compartments at a time.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the disclosure are now described by way of example with reference to the accompanying drawings in which.

In the drawings, like reference numerals designate similar parts.

DESCRIPTION OF EMBODIMENTS

Figure 1A:
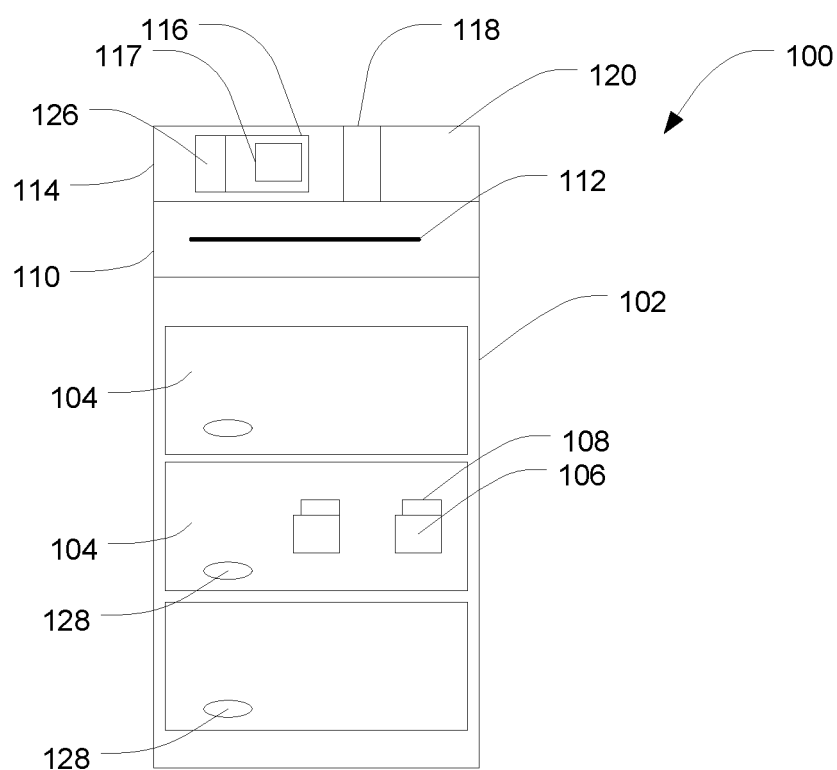
FIG. 1A is a schematic representation of an embodiment of an inventory control system in use in a first configuration of a cabinet.

FIG. 1A shows an embodiment of an inventory control system 100 used with a receptacle, such as a cabinet 102. The cabinet 102 has a number of compartments, in this example, three drawers 104 that each hold items 106 tracked by the inventory control system 100. Each item 106 has an electronic tag 108, in the form of an RFID tag, associated with it. For example, the tag 108 is adhesively attached to its associated item 106. The system 100 includes at least one electronic reader 110 for reading the tags 108 of the items 106.

In the illustrated embodiment, the RFID reader 110 includes an RFID antenna 112 to which the type of tags 108 to be read are responsive. For example, passive RFID tags are read using antennas that emit sufficient power to energise the tags. The antenna 112 is typically an orientation insensitive antenna in the sense that it is able to read RFID tags present in the cabinet 102 in any orientation relative to the antenna 112.

The inventory control system 100 includes a controller 114 that controls access to the drawers 104. The inventory control system 100 also includes a processor 120 that determines the contents of the drawers 104 based on the drawer to which the controller 114 provides access as well as the tags 108 read by the reader 110.

The controller 114 controls access to the drawers 104, for example, by controlling an electronic locking system that locks and unlocks the drawers 104 enabling a user to open and close an unlocked drawer. Typically the controller 114 only allows access to one drawer 104 at a time. In some embodiments the controller 114 may also control the operation of a mechanical actuator that opens an unlocked drawer. An example of a drawer and lock configuration that can be used is a drawer slide with an integrated electronic lock, such as the Accuride™ 38EL integrated electronic lock available from Accuride International, Inc., of 12311 Shoemaker Avenue, Santa Fe Springs, Calif., 90670, USA. The drawer slide has sensor feedback to the electronic lock and/or controller 114 indicating the drawer locking status.

The controller 114 has a user interface 116 that receives input from a user relating to items to be removed from, or placed in, one of the drawers 104. In some embodiments the user interface 116 includes an authentication mechanism 126. Presented with a user identifier, the authentication mechanism 126 activates access control. For example, a user may have a user swipe card and the authentication mechanism 126 is a magnetic reader. If the magnetic reader identifies the user and authenticates the user's identity, the controller 114 activates an access control configuration in order to unlock or open any one of the drawers 104 as required. While the authentication mechanism has been described with reference to a swipe card system, it will be appreciated that any other suitable authentication mechanism can be used, for example, an RFID card reader, a biometric identification mechanism, or the like.

The user interface 116 includes an indicator to indicate to the user which drawer 104 has been unlocked. In some embodiments the indicator is shown on a display 117 of the user interface 116. In other embodiments each drawer 104 has an enunciator 128, for example, an LED associated with it, to alert the user to which drawer 104 access has been given by the controller 114.

The controller 114 is in data communication with an inventory database 118 containing information relating to inventoried items and their locations, as well as the contents of each drawer 104. Based on the input user requirements, the controller 114 retrieves location information from the database 118 and unlocks, opens or otherwise provides access to the appropriate drawer 104. While the database 118 is shown in this embodiment as being arranged within, or on, the cabinet 102, the database 118 may be remotely arranged relative to the cabinet 102 with the controller 114 communicating wirelessly or in a wired manner with the database 118.

The processor 120 processes data received from the RFID reader 110 about any tags 108 identified within the cabinet 102, and also data received from the controller 114 about drawer access. In one embodiment, the drawer access data are based on access provided by the controller 114, i.e. which drawer 104 is unlocked by the controller 114. In another embodiment, the drawer access data are based on actual access, e.g. if a drawer 104 has been physically opened (either activated by the controller 114 or opened by a user). In some embodiments, if the controller 114 unlocks a drawer 104, then the cabinet 102 may include sensors used to monitor actual access, such as position or displacement sensors (e.g. a Hall effect sensor) (not shown). The processor 120 is in data communication with the database 118 and periodically updates the inventory data stored in the database 118.

Figure 1B:
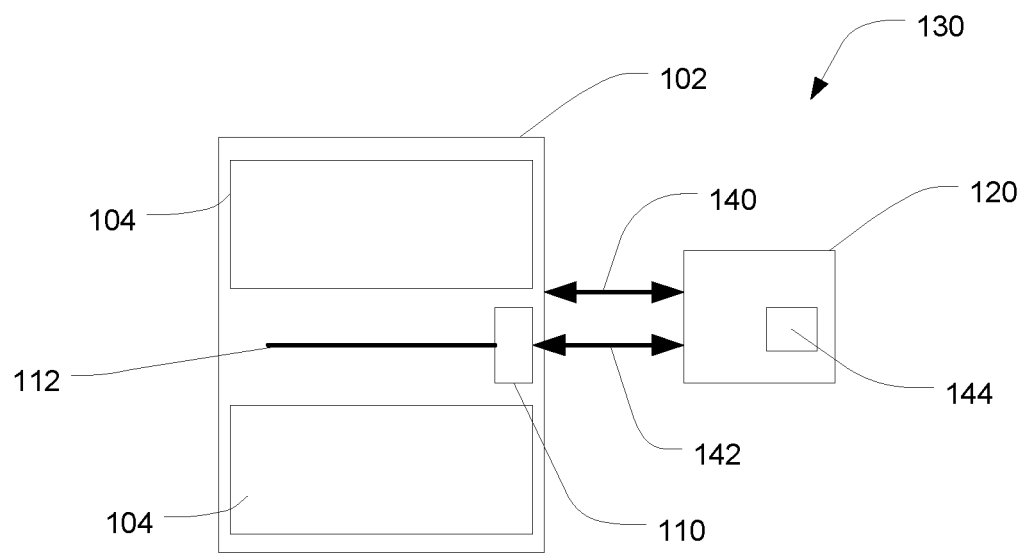
FIG. 1B is a schematic representation of an embodiment of an inventory control system in use in a second configuration of a cabinet.

FIG. 1B shows another embodiment of the inventory control system 130, where the antenna 112 of the electronic reader 110 lies between two drawers 104 of a cabinet 102. The antenna 112 reads tag data from both drawers 104. In this embodiment, the processor 120 effects both access control to the cabinet 102, via a communication link 140, and processing of the access control data and RFID data received from the reader 110 via a communication link 142. The processed data are stored as inventory data in an inventory database maintained in a memory 144 of the processor 120.

In both of the illustrated embodiments, the processor 120 may be a general purpose microprocessor, with executable instructions defined by a suitable programming language stored in an associated memory, e.g. memory 144. The processor 120 may also be an Application-specific Integrated Circuit (ASIC), digital signal processor (DSP), Field-Programmable Gate Array (FPGA) and/or other suitable processing hardware component(s). The controller 114 is typically software implemented on a suitable processor and in some embodiments may be implemented on the processor 120.

In both these embodiments, the drawers 104 typically do not include electromagnetic shielding and are therefore transparent to electromagnetic radiation emitted by the antenna 112. This results in a cost effective cabinet construction, and also means that the reader 110 is able to use one antenna 112 to read multiple compartments at a time depending on the size and configuration of the cabinet and compartments as well as the power of the antenna 112 of the electronic reader 110. Still further, the absence of shielding allows the system 100 to be retrofitted easily to an existing cabinet 102.

Figure 2:
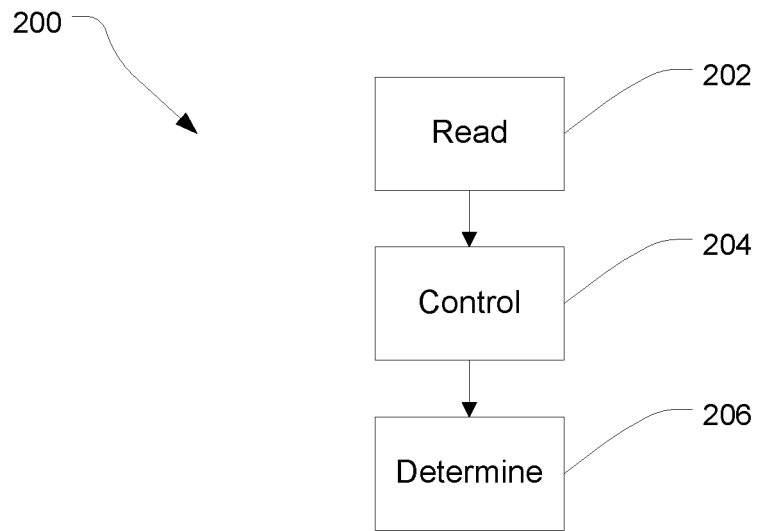
FIG. 2 is a flow diagram illustrating an embodiment of a method of controlling inventory in a receptacle comprising a plurality of compartments.

An embodiment of a method of controlling inventory in a receptacle comprising a plurality of compartments is illustrated in FIG. 2 of the drawings and is designated generally by the reference numeral 200. At 202 the reader 110 reads the RFID tags 108 within the various drawers 104 of the cabinet 102 via the antenna 112. At 204 the controller 114 controls access to the drawers 104, for example, by controlling an electronic locking system that locks and unlocks the drawers 104 enabling a user to open and close an unlocked drawer. In some embodiments the controller 114 may also control the operation of a mechanical actuator that opens an unlocked drawer 104.

Based on the RFID tags 108 read by the antenna 112 of the reader 110 at 202 as well as the access control effected at 204, the processor 120 determines which items 106 (each associated with an RFID tag 108) are present in the cabinet 102 after access has been gained to one or more drawers 104 of the cabinet 102. The processor 120 also determines inside which drawer 104 the items 106 are located depending on which drawers 104 were or could have been accessed. If a particular drawer 104 was accessed, then any change of items 106 detected from before the drawer 104 was accessed until after the drawer 104 was accessed, will provide an indication of items 106 removed or added to that specific drawer 104.

In some embodiments, the reader 110 continuously reads the contents of the cabinet 102 by activating the one or more antennas 112 one at a time to scan the contents of the cabinet 102, and simply updates the database when changes occur in the RFID tags 108 read by the reader 110. In other embodiments, the reader 110 only reads the contents of the cabinet 102 after access has been provided to a drawer 104, or after a drawer 104 has actually been accessed. In the latter case, the reader 110 may read the contents while the drawer 104 is being accessed, and/or after the drawer 104 has been accessed and re-locked.

Figure 3:
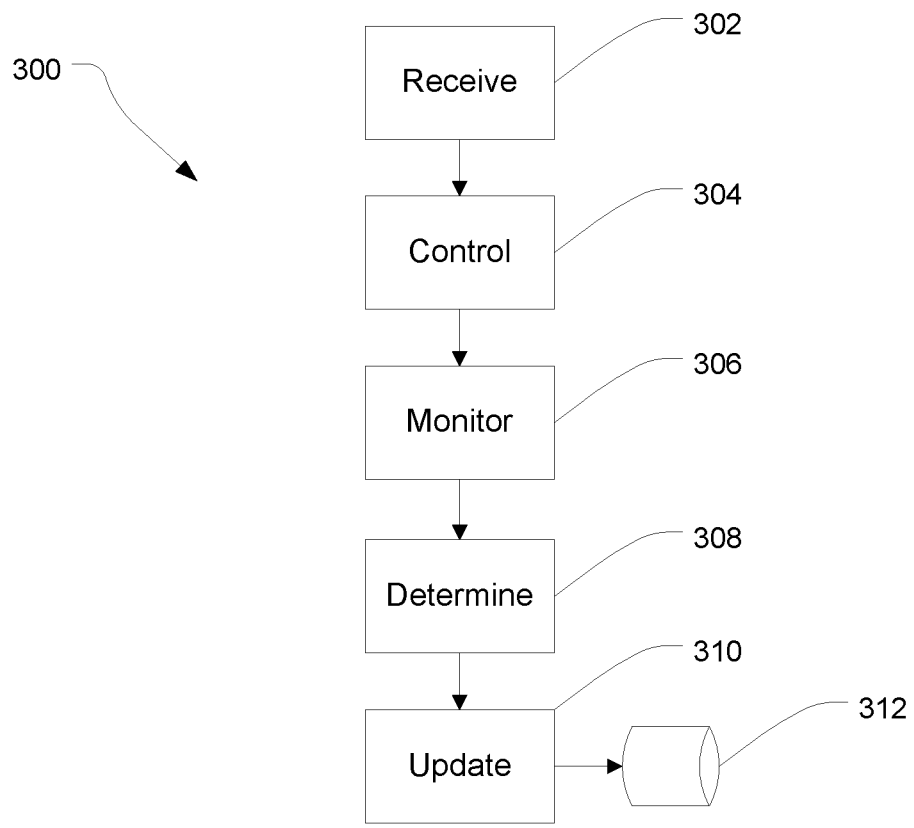
FIG. 3 is a flow diagram illustrating another embodiment of a method of controlling inventory in a receptacle comprising a plurality of compartments.

With reference to FIG. 3 of the drawings, a flow diagram of another embodiment of a method of controlling inventory in a receptacle comprising a plurality of compartments is illustrated and is designated generally by the reference numeral 300. At 302 RFID tag data are received that identify the items 106 present in the cabinet 102. In some embodiments these data are read by a single reader 110 having a single antenna 112 as shown in FIGS. 1A and 1B. In other embodiments there may be one reader 110 having multiple antennas 112 that are typically activated one at a time while, in still other embodiments, multiple readers 110 may be used, for example for large receptacles having a large number of compartments or spatially distributed items belonging to the same collection (e.g. in adjacent receptacles). In the latter instances, the data from each of the antennas 112 of the reader/s 110 are combined into one set of tag data. In some embodiments the tag data are read continuously with a reader 110 and antenna 112 that is always reading tag data in the cabinet 102. In other embodiments, the tag data are read periodically. It will be appreciated that where reference is made to multiple antennas 112, each such antenna 112 is still configured to read the contents of a plurality of the drawers 104 of the cabinet 102.

A step of controlling access is shown at 304, in which the controller 116 controls access to one or more of the drawers 104 of the cabinet 102. Actual access to the drawers 104 is monitored at 306, e.g. using displacement sensors such as magnetic or capacitive sensors (not shown). The contents of the drawers 104 are determined at 308 from the RFID data received at 302 together with the information about which drawers 104 were accessed. Each item 106 is assigned or associated with a compartment location indicating the drawer 104 where that item 106 is located. The locations are determined every time a drawer 104 is accessed and, typically, after the drawer 104 has been accessed, closed and re-locked.

At 310, a location database 312 is updated with the compartment location of each item 106 as determined at 308.

Figure 4:
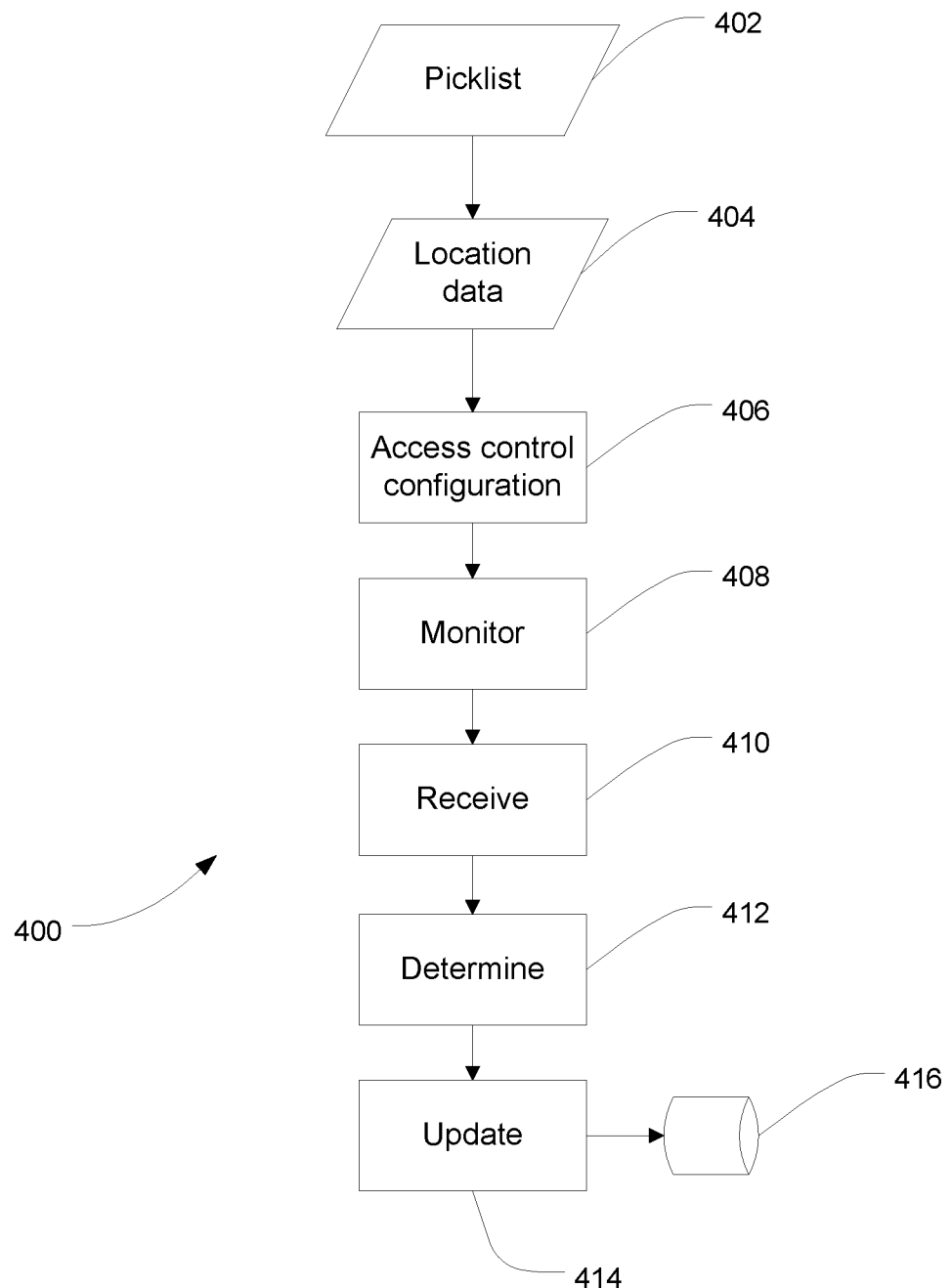
FIG. 4 is a flow diagram illustrating a further embodiment of a method of controlling inventory in a receptacle comprising a plurality of compartments.

Referring now to FIG. 4 of the drawings, a flow diagram of a further embodiment of a method of controlling inventory in a receptacle comprising a plurality of compartments is illustrated and is designated generally by the reference numeral 400. At 402 a pick-list of items 106 configured by a user is received into the controller 114 via the user interface 116. More particularly, the user inputs a list of one or more items 106 to be retrieved from the cabinet 102 into the user interface 116 of the controller 114. At 404 the controller 114 accesses the location database 118 to find drawer locations for each of the items 106 on the user's list. At 406 the controller 114 determines an access control configuration that will allow the user access, one drawer 104 at a time, in order to retrieve the selected items 106. The drawers 104 are unlocked or opened in a specific order, one at a time, providing restricted access to the drawers 104 so that items 106 and their locations within the cabinet 102 can be tracked with precision.

At 408 the controller 114 monitors actual access to the drawers 104 of the cabinet 102, and at 410 RFID tag data are received from the reader 110. At 412 the monitored access data and tag data are used to determine the contents of each of the drawers 104, and a drawer location is associated with each item 106. Where the location data have changed for an item, the data are updated at 414 and the updated data are stored in the location database 118 as shown at 416.

An advantage of the systems and methods described herein is that electromagnetic shielding is not required between compartments in order to distinguish between the contents of adjacent compartments. The receptacle compartments typically do not include electromagnetic shielding and are therefore transparent to electromagnetic radiation emitted by the antenna/s of the electronic reader so that the reader is able to use a single antenna to read multiple compartments at a time depending on the size and configuration of the cabinet and compartments as well as the power of the electronic reader's antenna. Because shielding can be costly, this means that a more cost efficient construction of cabinets can be used. In addition, it makes the proposed solution versatile because it can be used with a variety of types of cabinets or receptacles that do not need to be customised using magnetic shielding. The absence of shielding also allows an inventory control system to be retrofitted easily to an existing cabinet.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An inventory control system for controlling inventory in a receptacle comprising a plurality of compartments, the system including:
   an electronic reader configured to read a plurality of electronic labels in a plurality of the compartments of the receptacle, each electronic label being associated with, and identifying, an item in one of the compartments of the receptacle;
   at least one antenna in communication with the electronic reader, the, or each, antenna being associated with multiple compartments and being configured to read electronic labels in those multiple compartments simultaneously so that the electronic reader identifies a group of labels in each of the multiple compartments, the, or each, antenna lying between compartments so that the electronic reader reads electronic labels in compartments above and below the, or each, antenna simultaneously;
   a controller controlling access to a selected one of the compartments at a time; and
   a processor configured to determine the contents of each compartment and a compartment location of each item based on only the group of labels and the selected one of the compartments.

2. The inventory control system of claim 1, wherein at least the multiple compartments of the receptacle are substantially transparent to electromagnetic radiation emitted by the, or each, antenna.

3. The inventory control system of claim 1, wherein the electronic reader reads the plurality of electronic labels continuously.

4. The inventory control system of claim 1, wherein the electronic reader reads the plurality of electronic labels periodically when or after the selected one of the compartments has been accessed.

5. The inventory control system of claim 1, wherein the processor updates the determined contents of the compartments and compartment locations of the items when or after the selected one of the compartments has been accessed.

6. The inventory control system of claim 1, wherein the, or each, antenna is insensitive to orientations of the electronic labels.

7. The inventory control system of claim 1, wherein the controller controls access to the plurality of compartments based on a pick-list of items configured by a user and activated by a user identifier.

8. A method of controlling inventory in a receptacle comprising a plurality of compartments, the method including:
   reading a plurality of electronic labels in a plurality of the compartments of the receptacle, each electronic label being associated with, and identifying, an item in one of the compartments of the receptacle, wherein the reading is performed using at least one antenna, the, or each, antenna lying between compartments so that the electronic reader reads electronic labels in compartments above and below the, or each, antenna simultaneously;
   controlling access to the plurality of compartments; and
   determining contents of the compartments and a compartment location of each item based on only compartments accessed and labels read.

9. The method of claim 8 wherein controlling access to the plurality of compartments includes controlling access to a selected one of the compartments at a time.

10. The method of claim 8, further including:
    monitoring access to the plurality of compartments; and
    wherein the determining is responsive to the plurality of electronic labels read and the monitored access.

11. The method of claim 10, wherein the determining occurs when or after a compartment has been accessed.

12. The method of claim 8 wherein the reading is continuous.

13. The method of claim 8 wherein the reading occurs periodically when or after a compartment has been accessed.

14. The method of claim 8 further including generating or updating a location database with the determined compartment locations of the items.

15. A method of controlling inventory in a receptacle comprising a plurality of compartments, the method including:
- receiving a pick-list of items configured by a user;
- retrieving a compartment location for each item from a location database;
- providing an access control configuration based on the compartment locations;
- monitoring which, if any, compartment has been accessed;
- receiving identification data of a plurality of read electronic labels in the plurality of the compartments of the receptacle from a single antenna associated with that plurality of compartments, each electronic label being associated with, and identifying, an item in one of the compartments of the receptacle, the antenna lying between compartments, wherein the receiving includes reading electronic labels in compartments above and below the antenna simultaneously;
- responsive to the identification data and the monitoring of access to the compartments, determining the contents of the compartments and a compartment location of each item; and
- updating the location database with the determined compartment locations of the items.

16. The method of claim 15, wherein the method further includes, responsive to the access control configuration, controlling access to a selected one of the compartments at a time.

* * * * *